United States Patent
Brunson

[19]

[11] Patent Number: 6,145,207
[45] Date of Patent: Nov. 14, 2000

[54] THREAD PITCH DIAMETER MEASURING SYSTEM

[75] Inventor: Gordon Brunson, Chagrin Falls, Ohio

[73] Assignee: Brunson Instrument Company, Kansas City, Mo.

[21] Appl. No.: 09/046,057

[22] Filed: Mar. 23, 1998

[51] Int. Cl.[7] .................................................. G01B 5/08
[52] U.S. Cl. ......................... 33/199 R; 33/199 B; 33/784
[58] Field of Search .............. 33/199 R, 199 B, 33/783, 784, 794, 795, 796, 803, 804, 810, 811, 829; 702/155, 157, 158, 161, 162; 324/157, 613

[56] References Cited

U.S. PATENT DOCUMENTS

| | | | |
|---|---|---|---|
| 517,066 | 3/1894 | Randa | 33/199 R |
| 1,549,635 | 9/1925 | Vokal | 33/199 R |
| 2,859,531 | 12/1958 | Maller | 324/613 |
| 3,895,356 | 7/1975 | Kraus | 702/161 |
| 3,955,073 | 5/1976 | Carew et al. | 702/161 |
| 4,470,010 | 9/1984 | Sears | 324/157 |
| 4,491,789 | 1/1985 | Benbow | 324/157 |
| 4,492,916 | 1/1985 | Jonhson | 324/157 |
| 4,524,524 | 6/1985 | Frank et al. | 33/147 M |
| 4,553,337 | 11/1985 | Brewster | 33/199 R |
| 4,567,670 | 2/1986 | Roulstone | 33/199 R |
| 4,736,313 | 4/1988 | Nishimura et al. | 702/162 |
| 4,947,555 | 8/1990 | Allen, III | 33/199 R |
| 5,020,230 | 6/1991 | Greenslade | 33/199 R |
| 5,048,197 | 9/1991 | Anderson | 33/829 |
| 5,168,458 | 12/1992 | Gomes | 33/199 R |
| 5,182,862 | 2/1993 | Frank et al. | 33/199 R |
| 5,276,971 | 1/1994 | Brewster | 33/199 R |
| 5,315,236 | 5/1994 | Lee | 324/157 |

OTHER PUBLICATIONS

Fred V. Fowler Co. Inc. Caliper Ultra–Call Mark III, published 1992.
Gagemaker PD System, published circa 1995.
Hewlett Packard HP 48G Series Quick Start Guide, published Dec. 1994.

*Primary Examiner*—Diego Gutierrez
*Assistant Examiner*—Maria Fernandez
*Attorney, Agent, or Firm*—Wm. Bruce Day

[57] ABSTRACT

A gauge system determines the thread pitch diameter of an internally or externally-threaded article and includes a standard measuring caliper with styli selected and fitted into the caliper to correspond to a particular thread type and pitch. The styli are mounted into the caliper to provide a reference zero position to the calipers for either externally or internally-fitted articles. A processor is associated with the calipers and styli and is of a type which is configured for hand-holding. The processor has input buttons for inputting a descriptor of internal or external threads, thread type and thread pitch. The processor software receives and processes information received from the caliper to calculate the thread pitch diameter. A display connected to the processor presents the thread pitch diameter.

3 Claims, 8 Drawing Sheets

6,145,207

THREAD PITCH DIAMETER MEASURING SYSTEM

FIELD OF THE INVENTION

This invention relates to gauges for measuring thread pitch diameter of internally or externally-threaded articles.

BACKGROUND OF THE INVENTION

It is necessary in the manufacture of threaded parts that the pitch diameter be measured to assure that the parts have the proper pitch diameter. Measurement of the pitch diameter of externally-threaded parts has been done by the use of a threaded micrometer using threaded rolls or anvils matched to the thread of the part. Special calipers and threaded rolls, or anvils, are disclosed in U.S. Pat. No. 4,553,337. Other types of thread pitch diameter measuring devices include thread ring gauges and thread plug gauges; however, these merely indicate whether the part matches the gauge and do not indicate the precise measurement of the part.

Measurement of the pitch diameter of internally-threaded parts is even more difficult; however, it can be accomplished by the use of the thread gauge shown in the '337 patent or by the use of a special thread plug gauge which is used only for that particular inside thread diameter and thread type.

Various gauges have been used, but all that have achieved versatility of measuring internal and external threads on multiple thread forms and pitches have suffered from high cost.

SUMMARY OF THE INVENTION

The present invention is directed to a gauge system which determines the thread pitch diameter of an internally or externally-threaded article. The gauge system includes a caliper which holds styli selected from a group of styli with each stylus corresponding to a range of thread types and pitches. The styli have surfaces which, when attached into the calipers, provide a reference zero position to the calipers regardless of use for internally or externally-threaded articles. A processor, such as a hand-held calculator/processor, is associated with the caliper/stylus system and has a keypad for inputting a descriptor of internal or external threads, and thread type and pitch. The processor receives and processes information received from the calipers and through an internal software program calculates the thread pitch diameter of the threads. A display connected to the processor presents the thread pitch diameter in numerals to the user.

The present arrangement preferably includes only a small set of styli with each pair adaptable for a fairly wide range of thread types and pitches. By having only a few sets of different types and sizes of styli, the commonly encountered range of thread types and pitches can be fully covered without having a significant array of dedicated gauges for different thread types and pitches. The objects of this invention are to provide a thread pitch diameter measuring device which measures internal or externally-threaded articles; to provide such a thread pitch diameter measuring device which uses a relatively few number of styli to measure a broad range of threaded articles; to provide such a thread pitch diameter measuring device which is more than a go/no go device and provides an actual measurement of the thread pitch diameter; and to provide such a thread pitch diameter measuring device which presents a precise, visual display of the diameter.

These and other objects of the invention will become apparent from the following description which, taken in connection with the drawings, provides an embodiment of the invention.

DESCRIPTION OF THE PREFERRED AND ALTERNATE EMBODIMENTS

Figure 1:
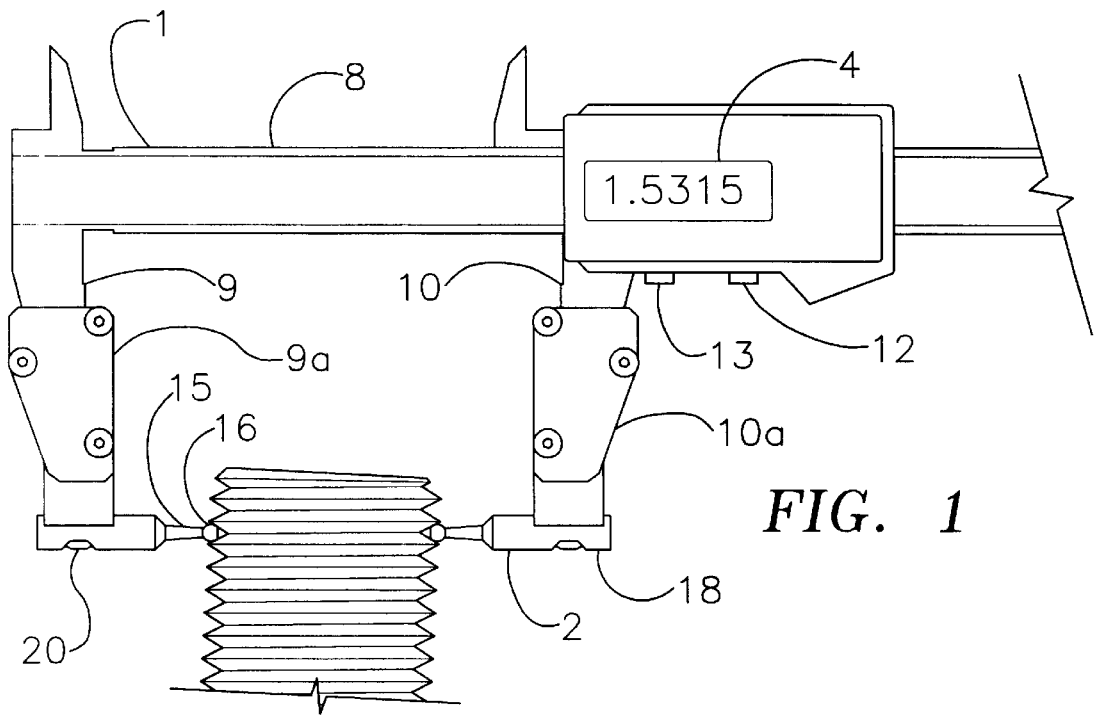
FIG. 1 is an elevational view of a measuring caliper with thread styli mounted in the caliper arms.

The following exemplary embodiment is intended for purposes of illustration. Other embodiments, using the concepts of the present invention, may be constructed and this patent is not limited to any specific form except insofar as set forth in the claims.

The components of the present invention provide a kit that generally consists of calipers 1 with special clamps 9a and 10a which hold selected styli 2, which are selected from an array of styli that are each adaptable for use with different thread sizes and pitches. A reading from the caliper showing the distance between the styli 2 is presented in a caliper window 4. The reading is then inputted into a small hand-held calculator 5 which processes the information using specially developed software. The software, after considering the geometry of the styli 2, the thread form, the thread pitch and caliper reading, outputs the actual pitch diameter for the part.

Manufacture of accurate threads is necessary to ensure proper thread mating, for inaccurate thread mating or interference can cause hydraulic or structural failure of the connection. The primary component of thread inspection is determination of the pitch diameter, or the diameter of the thread at the point of engagement midway through the thread form. Five popular thread forms are used, UN, Metric, Buttress, ACME and Stub ACME. More precisely, the device is designed to measure five forms of screw threads as set forth in the following table:

TABLE 1

| | |
|---|---|
| Std UN (60° V): | Includes UNC and UNF (60° included angle) |
| Std Metric (60°): | M profile series (60° included angle) |
| Buttress (7°/45°): | Buttress with 7" and 45° angles (52° included angle) |
| ACME: | Gen. Purp. and centralizing ACME (29° included angle) |
| Stub ACME: | Stub ACME (29° included angle) |

The thread pitch diameter kit is also used with different thread pitches, pitch ranges for the five different thread forms being set forth below in Table 2:

TABLE 2

| | |
|---|---|
| Std UN (60° V): | 4 to 20 threads/inch |
| Std Metric (60°): | 8 to 1.25 mm/thread |
| Buttress (7°/45°): | 1 to 20 threads/inch |
| ACME: | 1 to 20 threads/inch |
| Stub ACME: | 1 to 18 threads/inch |

The calipers 1 are preferably a high quality instrument having an accuracy in the order of 0.001". The calipers include a beam 8, a fixed arm 9 and a moveable arm 10. A suitable type of calipers is the Sylvac Ultra-Cal Mark III Digital Calipers which are readily commercially available. The calipers provide a digital display in the window 4 indicating the spacing between the styli 2 mounted in the ends of the clamps 9a and 10a. The calipers include right and left operating buttons 12 and 13 for providing functions of the calipers. Digital calipers are the preferred style of calipers because these allow the user to easily set a zero position and then measure a distance relative to that zero position.

The calipers are zeroed by pressing the right button, which is necessary when measuring threads.

A plurality of thread styli 2 are specially fabricated for the present invention. Each stylus 2 is formed of a tool steel stem 15 with a precision ground carbide ball 16 brazed on one end. The larger end 18 of the stem 15 is connectable into a stylus clamp 9a or 10a attached to the remote end of each of the arms 9 and 10. An identification number (not shown) is etched into each stylus 2. A plurality of sizes, such as 20 different sizes of styli 2 are available, depending upon the diameter of the stylus ball 16. These sizes range from size A, having a 0.53125" diameter ball to size T, having a 0.03125" diameter ball. The styli are always used in identical pairs with sizes never mixed when measuring pitch diameters.

Preferably, a basic kit of stylus pairs, including J, O and T sizes, are provided which enable the system to measure a significant range of thread forms and pitches.

Each stylus 2 is attached to the end of the stylus holding clamp 9a or 10a by a screw 20 which extends through a hole in the stylus stem 18 and into the end of the clamp 9a and 10a. The styli 2 are positioned with ball ends pointed inward for external threads, such as shown in FIG. 1 and may be reversed, or positioned with ball ends outward for internal threads (not shown). The range of pitch diameters that are capable of being measured is limited by the size of the calipers 1 and by the geometry of the styli 2. Caliper range limits the maximum pitch diameters which can be measured, such as for a kit with 6" calipers, externally-threaded parts ranging in size from zero to 4.7" pitch diameters can be measured. For internally-threaded parts, 6" calipers are capable of measuring parts from 2.3" to 7.5" pitch diameters.

Figure 2:
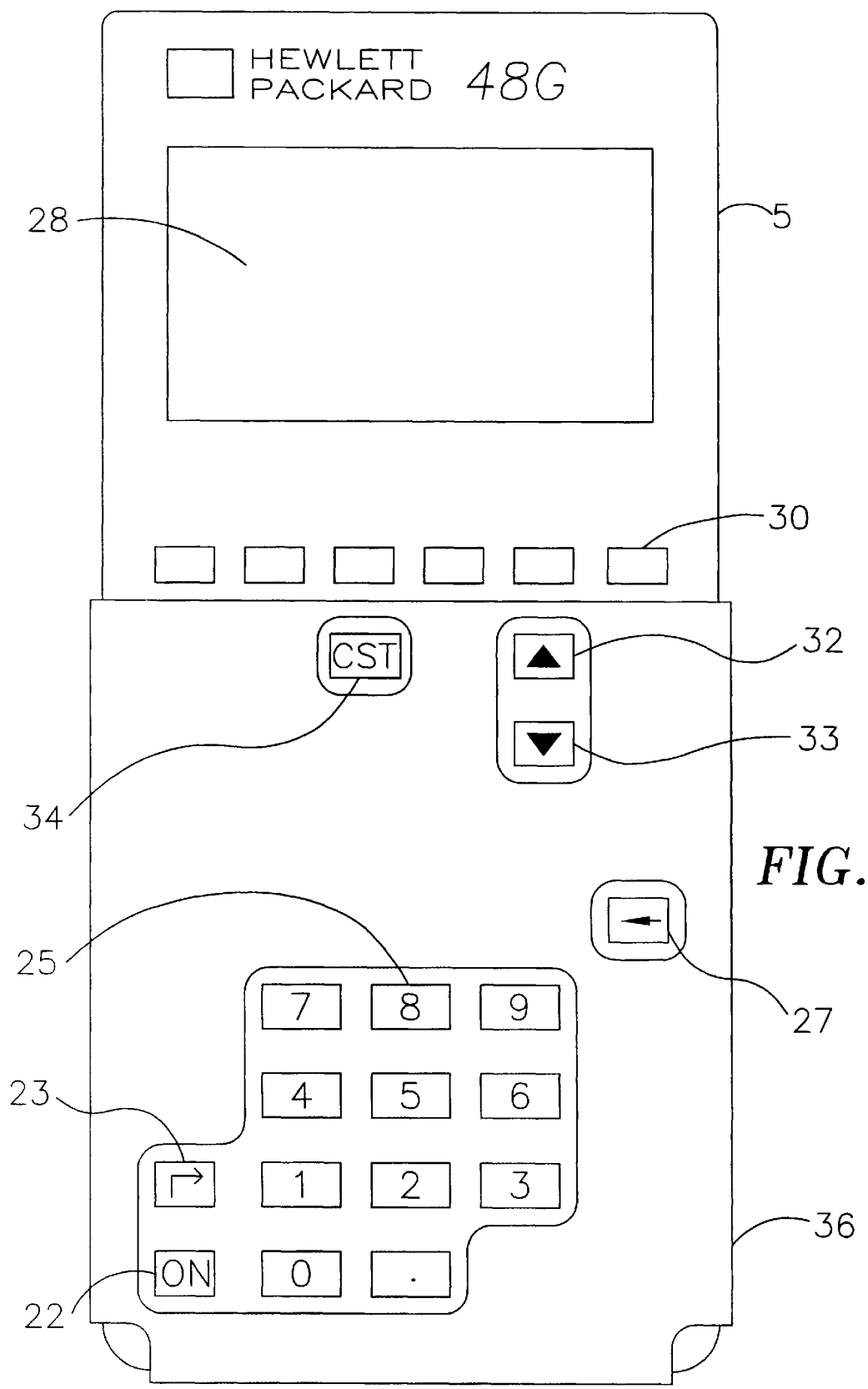
FIG. 2 is a plan view of a hand-held computer used with the caliper.

A Hewlett-Packard 48G Calculator, or other suitable device, is used as a platform for running software which processes measurements from calipers and styli to provide a readout for thread pitch diameter. The Hewlett-Packard 48G Calculator is a powerful scientific calculator with 32K of programmable memory. FIG. 2 shows the keys and components which are used with the thread stylus software.

To turn the calculator 5 on, press the on key 22 and to turn it off, press a green arrow key 23 located off directly above the on/off key 22. The remaining exposed keys in the lower part of the calculator 5 are numeric keys 25 which consists of digits zero through 9 and a decimal point key. These are used during pitch diameter measurement to enter a reading from the calipers 1. The calculator 5 includes a plurality of menu keys 30 which extend across the top of the key pad. The function of these menu keys 30 is written across the bottom line of the screen display 28, FIG. 3, and each menu key sets directly below its corresponding menu label.

The calculator 5 includes up and down keys 32 and 33 which are useful when making choices within lists presented by the software program. A CST key stands for "custom menu," and may be used to restore a thread stylus custom menu if standard menu labels do not appear as expected. The keys are set off from other keys on the calculator 5 by a slipover mask 36 with cutouts exposing the above-identified keys and covering unused keys.

Figure 3:
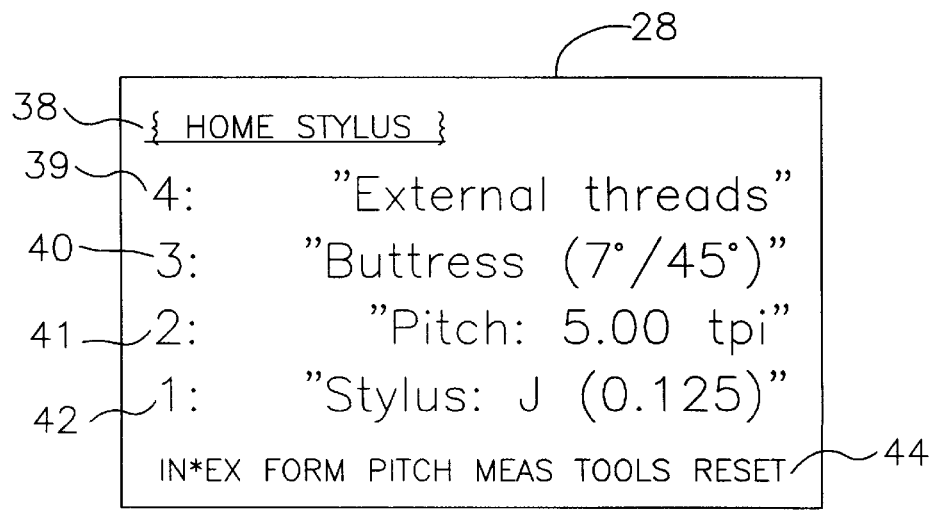
FIG. 3 is an exemplary screen display of the computer.

A typical screen presentation of the calculator 5 is shown in FIG. 3 and contains six lines of information. The first line, 38, is directory information showing the location of the thread stylus software within the calculator's memory. Four lines 39 through 42 of a stack of lines are positioned where most of the software input prompts are displayed. The backspace key 27 is used to erase a line of the stack 39 through 42. If the backspace key is pressed four times all four lines of the stack will be cleared. Pressing the reset menu key 30 will restore the screen. At the very bottom line 44 of the screen are the menu labels and as shown in the example in FIG. 3, the labels shown are the custom thread stylus labels. Pressing the CST key 34 restores the labels should an alternate menu be called by the user.

The components of the thread stylus kit work together to allow measurement of the pitch diameter of internally and externally-threaded parts having five popular thread forms as set forth above and including UN, Metric, Buttress, ACME, and Stub ACME. To measure a pitch diameter, the user must input information about the part to be measured into the calculator 5. The information inputted by the user includes whether the threads are internal or external, an identification of the thread form, and the thread pitch. Once this is loaded into the software, the software informs the user which size styli 2 to use. The threaded part is then measured using the calipers 1 with the appropriate pair of styli 2 attached. The ball ends 16 of the styli 2 fit into the thread groove at near-diametrically opposite positions of the screw threads. The resultant reading from the calipers 1 is then input into the software. The software, after considering the geometry of the styli, thread form, thread pitch, and caliper reading, outputs the actual pitch diameter for the part.

As mentioned above, the basic kit, including styli sizes J O and T, provides measurement capability for 57 different form/pitch combinations. However, for some ACME and Stub ACME pitches, a new sized pair of styli may be needed. The user is informed by the software when this is necessary. An example of use of the pitch diameter measuring system is as follows. The process is started by turning the calculator 5 on by pressing the on/off key 22. A display appears in the window 28, FIG. 2 which appears like the display shown in FIG. 3. The user sets the software for internal or external threads by pressing the menu key 30 below the menu label IN-EX. When this key is pressed, line 4 (numeral 39) of the display toggles between "internal threads" and "external threads." The user presses the key until the desired threads are displayed in line 4. Next, the user sets the software for the standard thread form, such as UN thread form by pressing the form menu key 30. This toggles line 3 of the display through five different thread forms. The user presses the key until the desired thread form, by pressing is displayed on line 3.

Next, the software is set for specified pitch, which is determined by the user. The user presses the pitch menu key 30 until "pitch" and the appropriate threads per inch is displayed on line 2.

The software then determines which stylus 2 is appropriate for this form and pitch of thread. The user presses the reset menu key 30 and line 1 displays the message "Stylus:" with an identification of the stylus letter and ball measurement. This informs the user which stylus is the best stylus in the kit to perform the required measurement.

Next, the user attaches the two designated size styli to the calipers 1, which are oriented with their ball ends pointing away from each other for measuring internal threads or toward each other for measuring external threads.

Next, the calipers are turned on by pressing the right button 12. The user then closes the calipers down until the ball ends of the styli (for external threads) or the stem ends (for internal threads) butt against each other. The calipers are then zeroed by pressing the right button 12 again.

Next, the calipers are used to measure the part by placing the calipers inside for internally-threaded parts and outside for externally-threaded parts. The ball ends of the styli are placed into the thread grooves and should be as diametrically opposed as possible. The user manipulates the calipers with the ball ends of the styli pressed into the thread groove until a maximum reading is reached and makes a note of the reading.

Next, the software calculates the thread pitch diameter. The user presses the MEAS (for measurement) menu key. An input window appears, prompting the user for the reading from the calipers. The user keys in the appropriate number. Then user then presses the "OK" menu key to place the number into the register at the top of the input window. He presses the "OK" key again and the software calculates the thread pitch diameter. The output window reads "pitch diameter," and displays a numerical reading. The main menu may then be recalled by pressing the "OK" menu key again.

Overview of the Thread Stylus Software

The software consists of 15 individual programs and numerous sets of reference information which are stored to enable accurate calculation of pitch diameters. When the calculator is initially turned on, the Custom Thread Stylus menu labels IN-EX for internal-external, FORM, PITCH, MEAS (for measurement), TOOLS, and RESET appear at the bottom of the screen and the four lines of the stack containing thread information, including internal/external threads, thread form, thread pitch, and stylus appear above the menu labels. Pressing the CST key 34 restores the Custom Thread Stylus menu. The RESET menu key 30 may be pressed to redisplay the stack properly.

Figure 4:
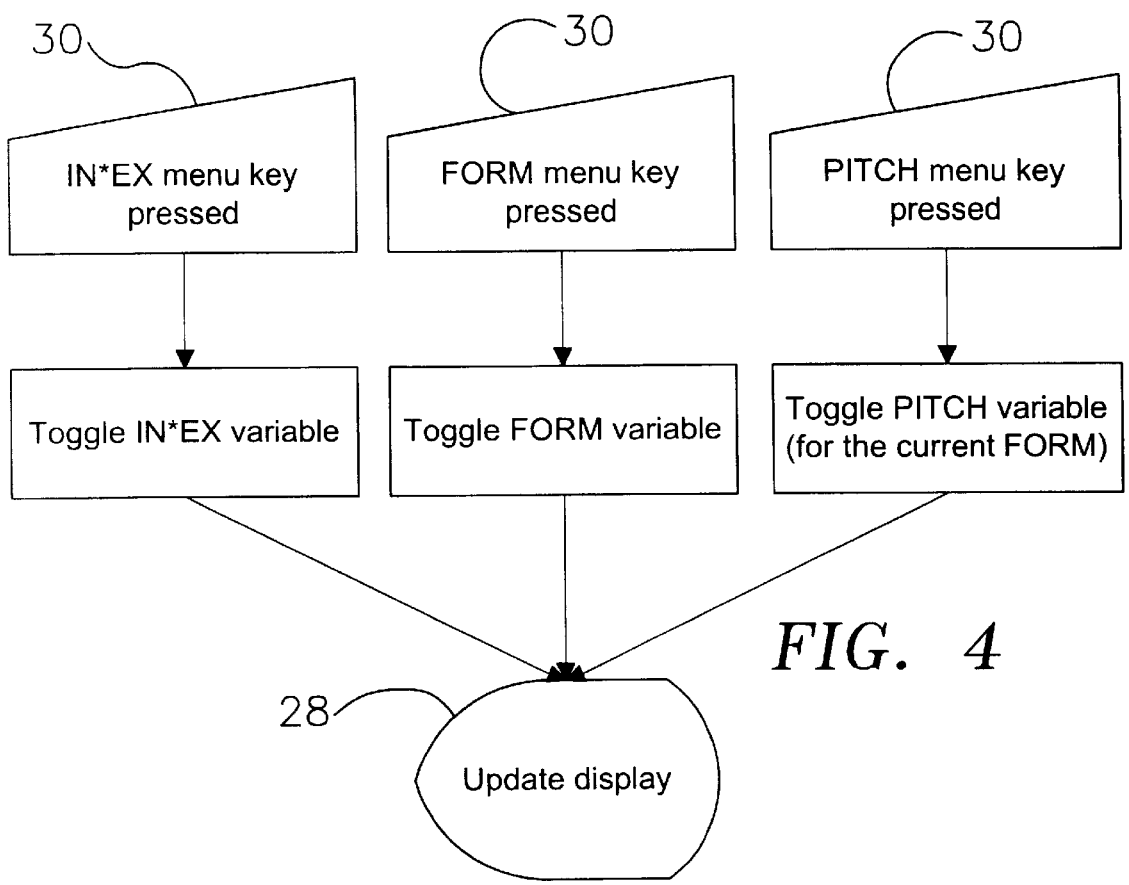
FIG. 4 is a diagram showing the computer software steps for changing thread form, pitch and internal/external thread type.

Referring to FIGS. 4 through 8, the first user step to calculate pitch diameters with the software comprises setting the software for internal or external threads. Referring to FIG. 4, pressing the IN-EX menu key toggles line 4 of the stack shown in FIG. 3 between internal threads and external threads. The user presses the key until line 4 displays the correct information about the threaded part intended to be measured.

Referring to FIG. 4, next the user inputs thread form information into the software by pressing the FORM menu key 30 to toggle line 3, FIG. 3 of the stack through the five forms of screw threads measurable by the software. The five forms are set forth above in Table 1. The user toggles the key until the desired form is displayed on line 3. Toggling through the thread forms also causes the pitch display in line 2 of the stack to change. The thread pitch is set individually for each thread form. Toggling to a different thread form simultaneously recalls that forms' last pitch setting.

Figure 6A:
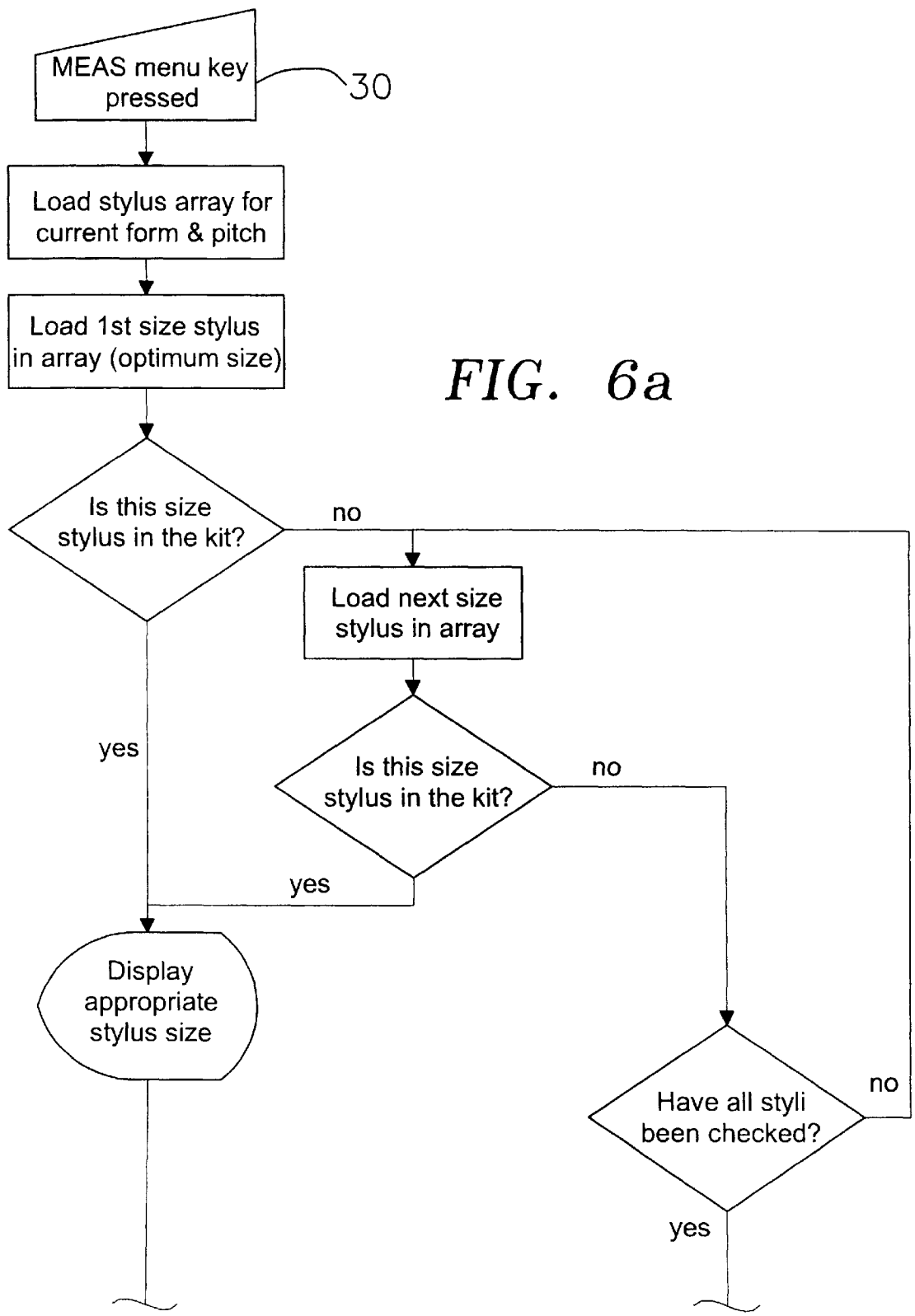
FIGS. 6a and 6b comprise a diagram of the computer software steps for a measurement function.
Figure 6B:
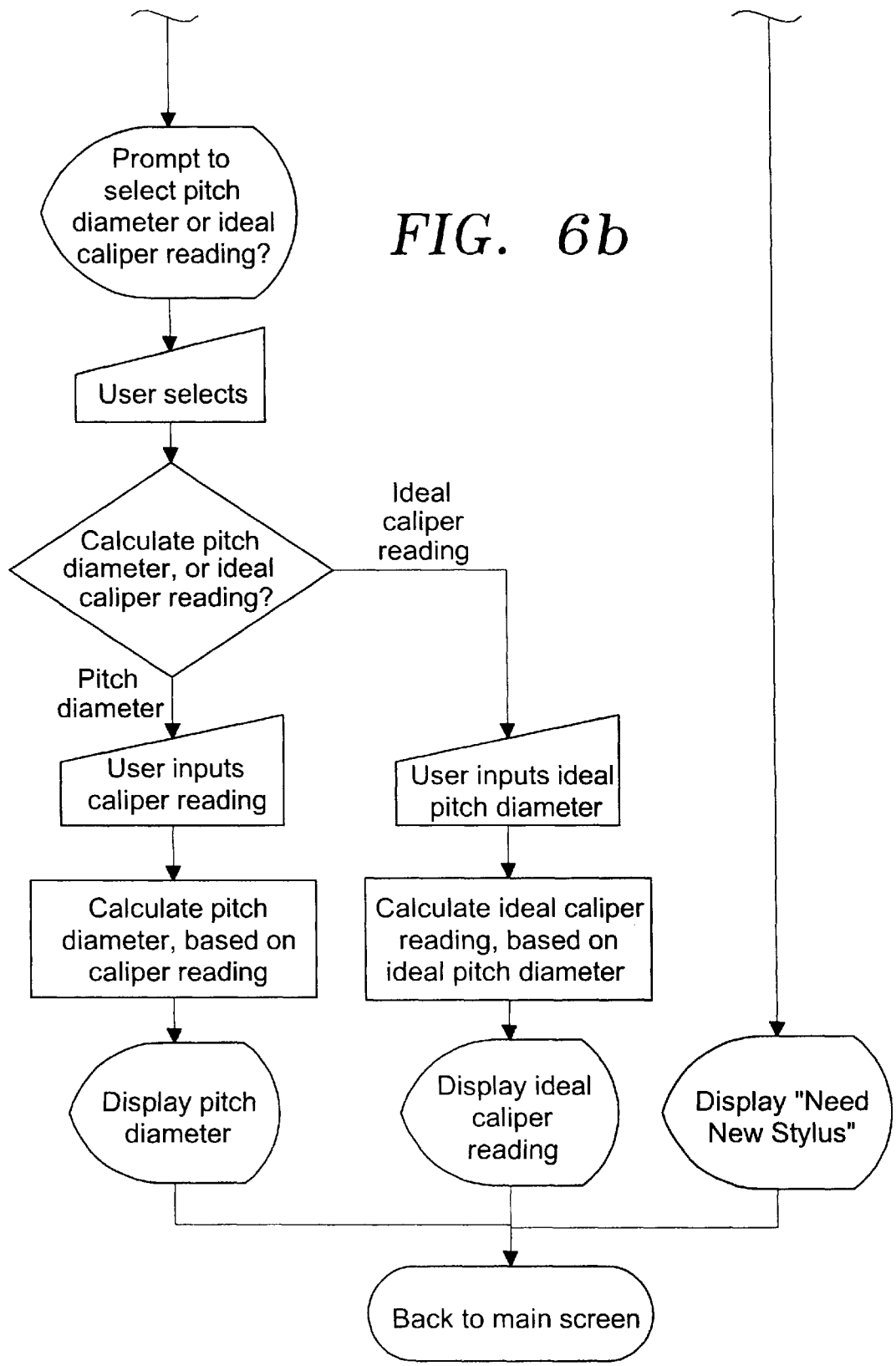

Inputting the thread pitch is shown in FIG. 6. Pressing the pitch menu key toggles line 2 of the stack through the range of pitches for the currently displayed thread form. The key is toggled until the desired pitch is displayed on line 2. Pitch ranges for the five thread forms are set forth in Table 2 above. Once the desired pitch is displayed, stylus information is displayed on line 1 by pressing the RESET menu key which will not change any of the other settings.

Figure 5:
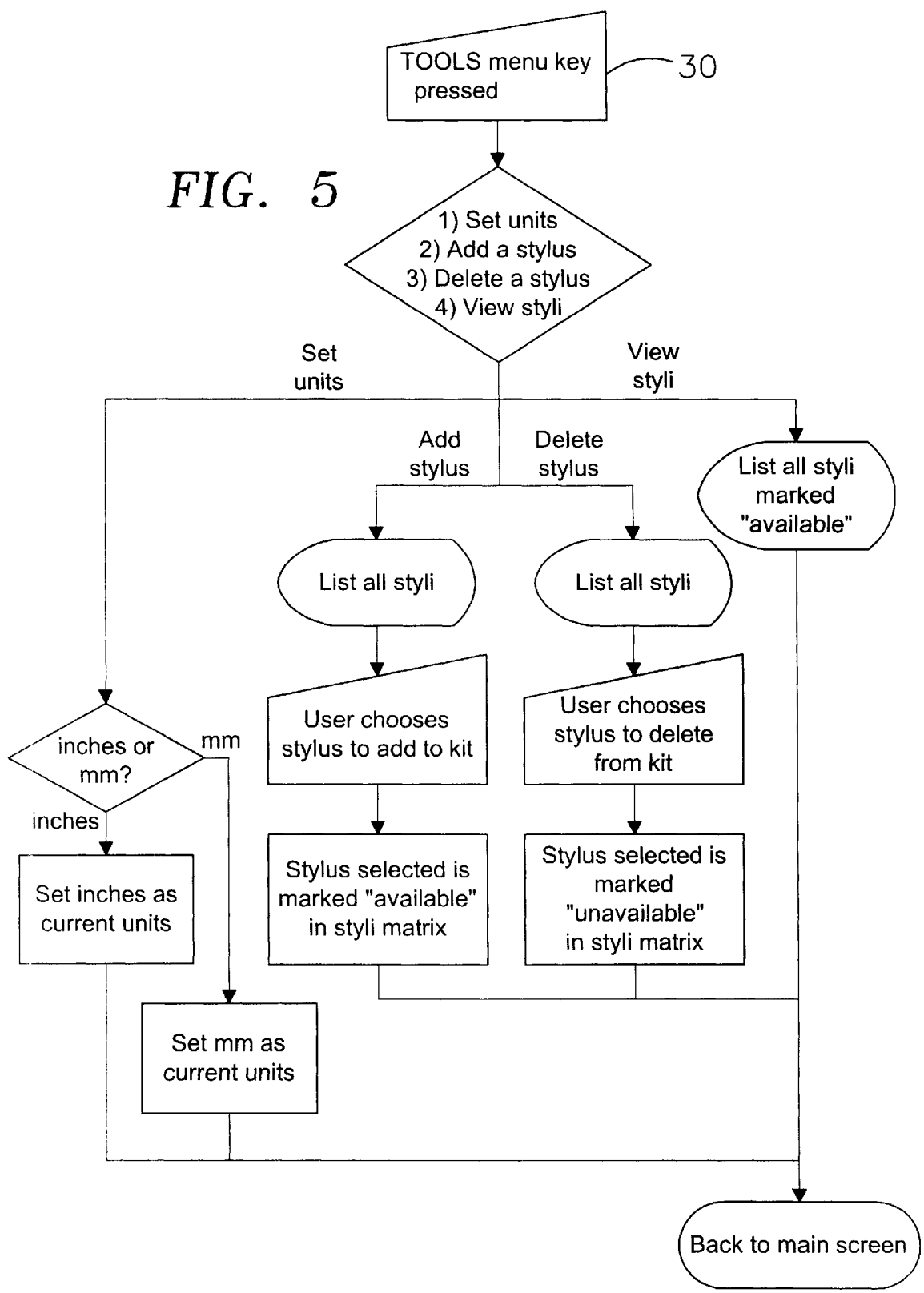
FIG. 5 is a diagram of the computer software steps for a TOOLS function.

Referring to FIG. 5, pressing the TOOLS button allows the user to set the measurement units in inches or millimeters, add a stylus or delete a stylus or to check the stylus sizes currently considered available by the software. To set the measurement units the TOOLS menu key is depressed and a special choice box appears with four choices. A black box highlighting the desired choice can be moved by pressing the up or down keys. The choice of units is independent of the thread form used; for example, UN thread pitch diameters can be calculated in inches or millimeters, the same with metric forms.

If the user obtains a new size stylus pair in order to expand or refine the capabilities of the kit, the software settings must be updated to show the new size stylus pair as available for use. Pressing the TOOLS menu key brings up a choice box with four choices including "add a stylus." From the "add a stylus" choice, another choice box is presented on the screen which contains 20 different choices, one for each stylus size from size A to T. A highlighted box is moved to the stylus which the user desires to add and the OK menu key is pressed. Deleting a stylus size from the software is done by pressing the TOOLS menu key and selecting the choice "delete a stylus" and pressing the OK menu key. A choice box with all 20 styli letters will appear. The size is chosen by moving the highlighted box to the stylus size the user wishes to delete and then pressing the OK menu key.

To check the stylus sizes currently considered available by the software, the TOOLS menu key is pressed, a "view styli" choice is highlighted and the OK button is pressed. The software will display an output window showing which styli are currently available.

FIG. 6 is a diagram of the operations of the software upon pressing the MEAS (measurement) menu key 30. The software initially recalls a stylus array from memory. The stylus array is a list of the names of all the styli sizes which can be used to measure the current thread form & pitch. The array lists these sizes in order of preference (the stylus size which will contact the thread flanks nearest the pitch line is the most preferred, i.e. the optimum size). The software goes through the list of stylus sizes in the array, beginning with the optimum size, and checks to see if the stylus size in question has been entered into the software as available for use (i.e. in the user's kit). If the stylus size from the array is found which is in the kit, the software displays the name and size of that stylus for the user, and stores that stylus as the current stylus size. If none of the stylus sizes in the array are contained in the kit, the software displays a "Need new stylus" message for the user.

If the stylus is in the kit, the software next prompts the user to choose between a measured pitch diameter or an ideal caliper reading. If a measured pitch diameter is selected, the user than inputs a caliper reading and the software calculates the pitch diameter based on that caliper reading, then displays the pitch diameter on the screen. If an ideal caliper reading is selected, the user than inputs a specified pitch diameter and the software calculates the ideal caliper reading based on that pitch diameter, then displays the caliper reading on the screen.

Figure 7A:
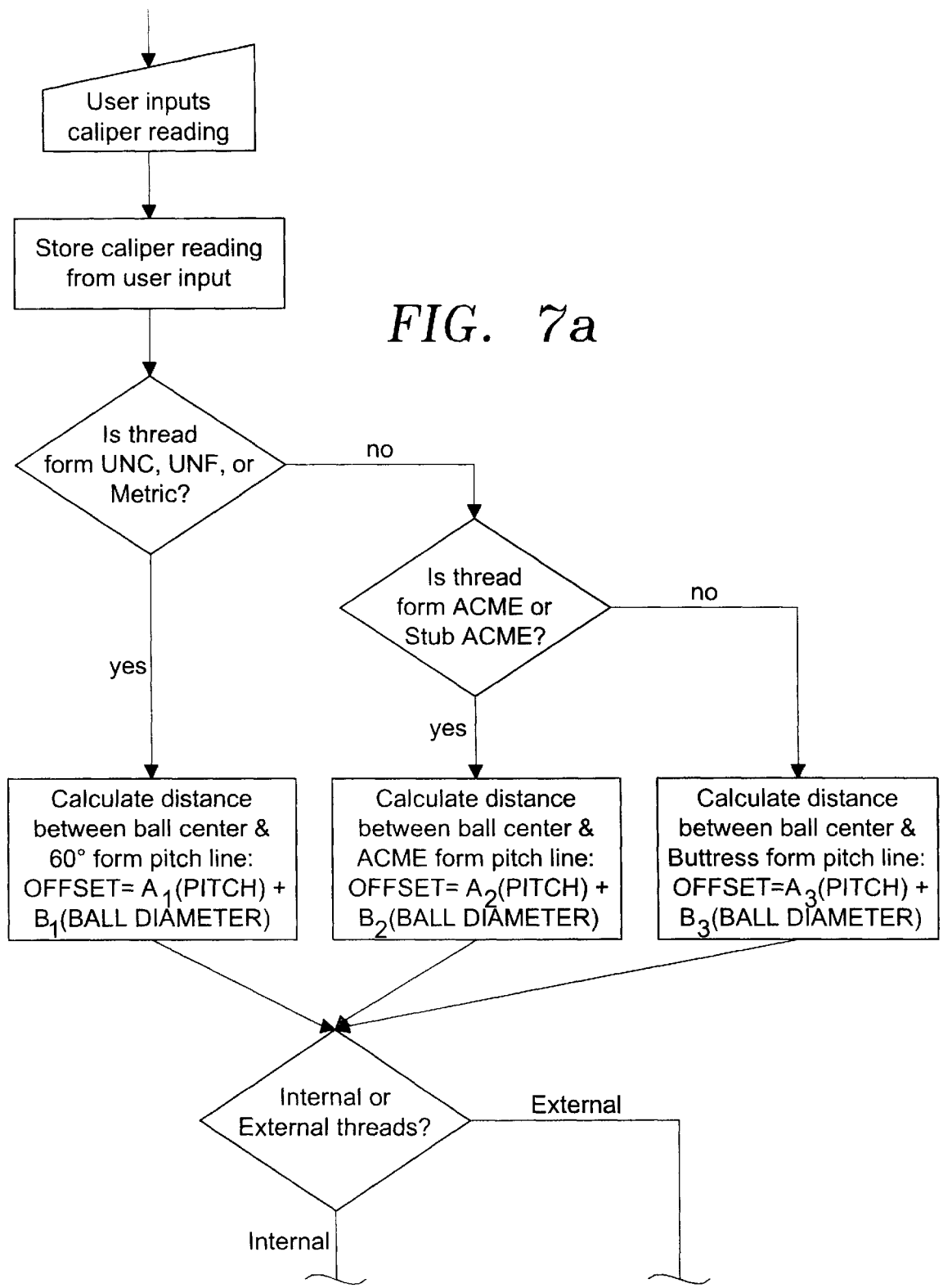
FIGS. 7a and 7b are a diagram of the calculation of pitch diameter and comprise an explanation of the measurement diagrams.
Figure 7B:
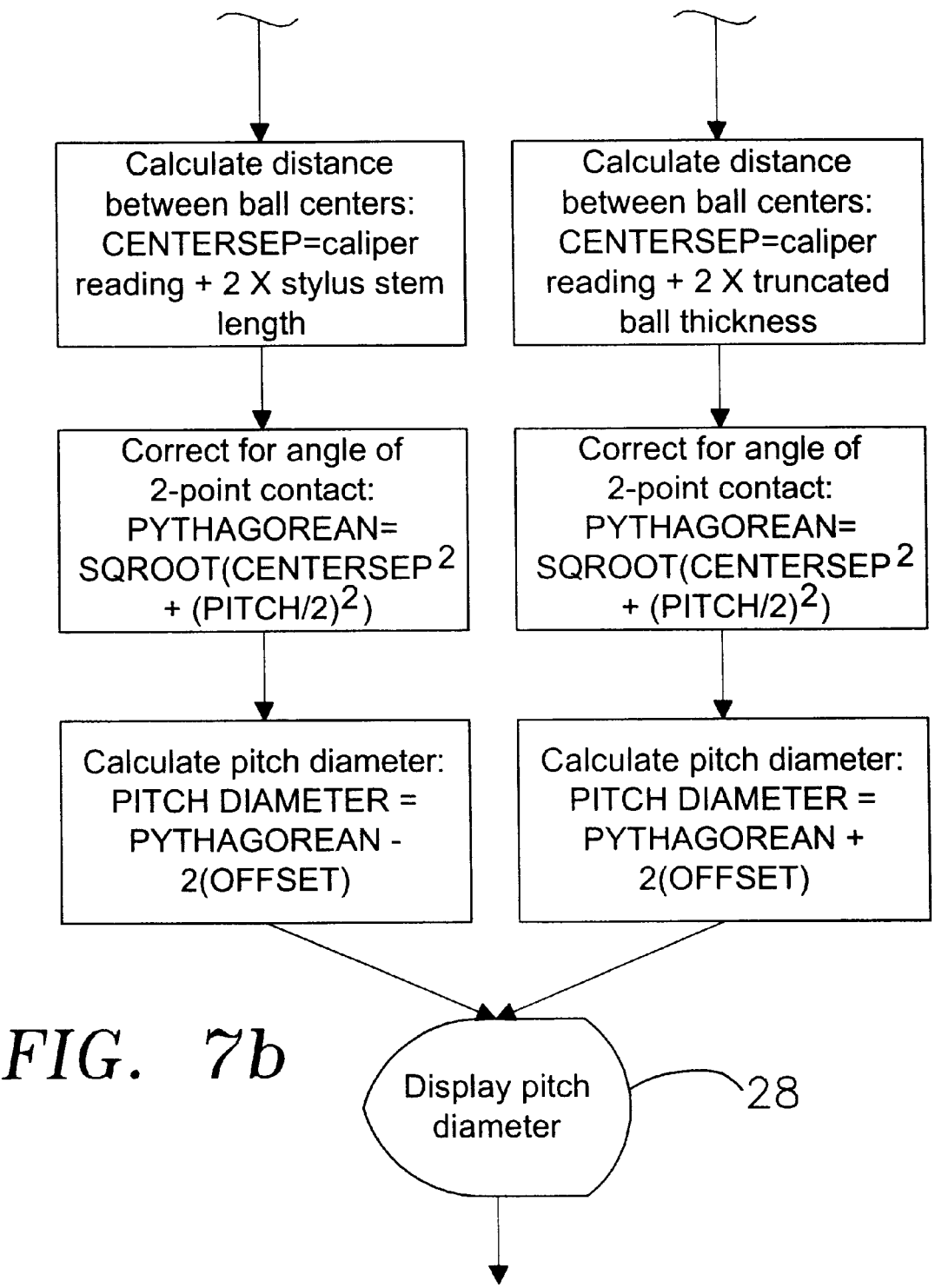

FIG. 7 is a diagram of the operation of the software when calculating a measured pitch diameter based on a caliper reading. This function is an expansion of the calculation step in the previous diagram showing the Measurement function.

After the user inputs the caliper reading, the software stores this value. The software then calculates the value of the OFFSET, or distance between the center of the stylus ball and the pitch line of the current thread form & pitch. The OFFSET distance lies along a diametral line of the threaded part. The OFFSET is considered positive if the ball centerpoint lies between the pitch line and the thread root; it is considered negative if the ball centerpoint lies between the pitch line and the thread crests, and it is zero if the ball centerpoint lies exactly on the pitch line.

For the calculation of the OFFSET, the five relevant thread forms are broken into three groups: Forms which have a 60° included angle (UNC, UNF, Metric), forms which have a 29° included angle (ACME & Stub ACME), and the form with 7° & 45° flank angles (Buttress). The OFFSET distance is a sum of linear functions of the thread pitch and the stylus ball diameter. Each of the three groups of thread forms has its own set of constants for these linear functions. The constants are determined through ideal trigonometric modeling of the thread form, pitch and stylus ball diameter.

The software then separates the calculation flow into two groups: internal threads and external threads. The value of the CENTERSEP, or separation distance between the two stylus ball centers during the thread measurement, is then calculated. For internal threads, the CENTERSEP distance is the sum of the caliper reading plus twice the length of the stylus stem. For external threads, the CENTERSEP distance is the sum of the caliper reading plus twice the thickness of the truncated stylus ball. The stylus stem length and the truncated ball thickness for the current stylus size are taken from the software's reference information on stylus geometry.

Because the stylus ball-ends are not exactly diametrically opposed on the threaded part during measurement, the software must process the CENTERSEP distance to correct for the small angle existing between the line connecting the ball centers and a line along the part's diameter. The PYTHAGOREAN, or diametral distance between the ball centers, is calculated as the near side of a right triangle, with the CENTERSEP line as the hypoteneuse length, and half of the thread pitch as the far side length.

The software then calculates pitch diameter by combining the PYTHAGOREAN distance with the offset distance of the pitch diameter from the ball centers. For external threads, the pitch diameter is the sum of the PYTHAGOREAN plus twice the OFFSET. For internal threads, the pitch diameter is the difference of the PYTHAGOREAN minus twice the OFFSET.

The software similarly can calculate an ideal caliper reading based on a specified pitch diameter. For this calculation, the user inputs a pitch diameter. Then the equations which define the relationships between caliper reading, pitch diameter, ball-center to pitch-line offset, stylus length, and truncated ball thickness are solved for the caliper reading instead of the pitch diameter.

The software program is written in the programming language used for the Hewlett-Packard 48G calculator, although other languages may be suitable for other hand-held calculator/computers.

Although the above-described list consisting of calipers with an array of styli has been described in connection with software written particularly for the inexpensive and easily carried Hewlett-Packard 48G hand-held calculator/computer, other appropriate or equivalent calculator/computers may be used, as will be readily apparent to those skilled in the art. Other computers may use different and particular programming languages and steps. The above description is not intended to limit the instant invention to a particular computer nor to a particular programming language.

What is claimed and desired to be secured by letters patent is as follows:

1. A gauge system for determining the thread pitch diameter of an internally or externally threaded article without the need for a physical standard for comparison purposes, and without the need for gauge styli specific to a single thread form or a single thread pitch, said system comprising:

a) styli with means to mount the styli to a standard caliper, the styli having ball-ends for contact with the threads of a variety of threaded articles with a variety of thread pitches and forms;

b) a processor containing information about the styli being used, and having means for inputting a description of a particular threaded article being measured as having internal or external threads, the thread form, and pitch therein, said processor receiving the reading from said caliper/styli system, said processor then calculating the following values:

1) the offset distance between the threaded article's pitch line and the center of the contacting stylus' ball end, based on said pitch, form and styli information;

2) the separation distance between the two styli ball end centers, based on said caliper reading and styli information;

3) the distance between the two styli ball end centers along a diametral line of the threaded article, based on said separation distance and pitch information;

4) the pitch diameter of the threaded article, based on said diametral distance and said offset distance; and c) a display connected to said processor for presenting said pitch diameter.

2. The gauge system set forth in claim claim 1 wherein said thread styli are selected from a set of styli, with each such stylus being matched to a range of thread types and pitches.

3. The gauge system set forth in claim claim 1 wherein said thread styli have surfaces for providing a reference zero position to said calipers prior to measurement, with geometric information stored in the processor which relates this zero position to thread pitch diameter.

* * * * *